(12) United States Patent
Subramanian et al.

(10) Patent No.: US 12,264,527 B2
(45) Date of Patent: Apr. 1, 2025

(54) FOOT OPERATED LAVATORY DOOR ACTUATION AND DE-ACTUATION

(71) Applicant: B/E Aerospace, Inc., Winston Salem, NC (US)

(72) Inventors: Sanith Kurumpilavu Subramanian, Chikkabanavara (IN); Dharamveer Surya Prakash Bathla, Sonepat (IN)

(73) Assignee: B/E AEROSPACE, INC., Winston-Salem, NC (US)

( * ) Notice: Subject to any disclaimer, the term of this patent is extended or adjusted under 35 U.S.C. 154(b) by 505 days.

(21) Appl. No.: 17/327,607

(22) Filed: May 21, 2021

(65) Prior Publication Data

US 2021/0363798 A1 Nov. 25, 2021

Related U.S. Application Data

(60) Provisional application No. 63/029,206, filed on May 22, 2020.

(51) Int. Cl.
*E05F 15/73* (2015.01)
*E05B 47/00* (2006.01)
(Continued)

(52) U.S. Cl.
CPC .......... *E05F 15/73* (2015.01); *E05B 47/0012* (2013.01); *E05B 53/001* (2013.01);
(Continued)

(58) Field of Classification Search
CPC ........ E05B 53/001; E05B 65/08; E05C 9/021; E05C 9/12; E05C 9/041; E05F 2015/765;
(Continued)

(56) References Cited

U.S. PATENT DOCUMENTS 3,012,837 A 12/1961 Morrissey, Jr.
4,994,722 A 2/1991 Dolan et al.
(Continued)

FOREIGN PATENT DOCUMENTS

CA 2627110 A1 10/2009
CN 109162529 A 1/2019
(Continued)

OTHER PUBLICATIONS

Extended European Search Report for European Patent Application No. EP21175699.4, dated Nov. 2, 2021.
(Continued)

*Primary Examiner* — Christine M Mills
*Assistant Examiner* — Yahya Sidky
(74) *Attorney, Agent, or Firm* — SNELL & WILMER L.L.P.

(57) ABSTRACT

A door system comprises a door, the door including a latch assembly configured to latch the door to a door frame to maintain the door in a closed position and to unlatch to allow the door to open to an opened position. A foot pedal is operatively connected to unlatch the latch assembly upon actuation by a user's foot. In certain embodiments, a handle can be operatively connected to unlatch the latch assembly upon actuation a user. The door system further includes the door frame and set of hinges operatively connecting the door to the door frame.

20 Claims, 8 Drawing Sheets

(51) Int. Cl.
    *E05B 53/00*     (2006.01)
    *E05C 9/04*     (2006.01)
    *E05F 15/40*     (2015.01)

(52) U.S. Cl.
    CPC ............. *E05C 9/041* (2013.01); *E05F 15/40* (2015.01); *E05F 2015/765* (2015.01); *E05Y 2900/132* (2013.01)

(58) Field of Classification Search
    CPC ............. E05Y 2900/132; Y10S 292/46; Y10T 292/0834; Y10T 292/0836; Y10T 292/0843; Y10T 292/19
    See application file for complete search history.

(56) References Cited

U.S. PATENT DOCUMENTS

| | | | | |
|---|---|---|---|---|
| 6,328,392 | B1* | 12/2001 | Whitcomb | F25D 23/028 |
| | | | | 312/319.9 |
| 7,412,799 | B1* | 8/2008 | Aguirre | E06B 7/086 |
| | | | | 49/51 |
| 8,720,827 | B2 | 5/2014 | Boren | |
| 8,745,922 | B1* | 6/2014 | Matsuda | E05C 19/006 |
| | | | | 49/269 |
| 8,888,045 | B2 | 11/2014 | Boren et al. | |
| 9,045,231 | B2 | 6/2015 | Swain | |
| 9,447,625 | B1 | 9/2016 | Seebaransingh et al. | |
| 2005/0028946 | A1* | 2/2005 | Weishar | E05F 15/643 |
| | | | | 160/214 |
| 2011/0271484 | A1* | 11/2011 | Irwin | E05F 1/1284 |
| | | | | 16/273 |
| 2012/0119521 | A1 | 5/2012 | Lehr | |
| 2014/0196372 | A1 | 7/2014 | Boren et al. | |
| 2014/0267739 | A1 | 9/2014 | Ibsies | |
| 2014/0333073 | A1* | 11/2014 | Bartos | E05B 47/0673 |
| | | | | 292/32 |
| 2015/0027060 | A1* | 1/2015 | Sousa | E05B 17/2038 |
| | | | | 49/394 |
| 2018/0209203 | A1 | 7/2018 | Shen | |
| 2018/0245384 | A1* | 8/2018 | Shipley | E05C 17/60 |
| 2019/0128022 | A1 | 5/2019 | Markway | |
| 2020/0164988 | A1 | 5/2020 | Alvarez | |

FOREIGN PATENT DOCUMENTS

| | | | |
|---|---|---|---|
| CN | 1101168179 | 4/2021 | |
| DE | 29807422 U1 | 1/1999 | |
| DE | 20104967 U1 | 6/2001 | |
| DE | 10119978 A1 | 12/2001 | |
| DE | 102014105565 A1 | 10/2015 | |
| EP | 1378622 A2 | 1/2004 | |
| FR | 1951487 | 4/2011 | |
| JP | 2000320196 | * 11/2000 | ........... E05B 53/001 |

OTHER PUBLICATIONS

Extended European Search Report for European Patent Application No. EP21175777.8, dated Nov. 10, 2021.

* cited by examiner

FOOT OPERATED LAVATORY DOOR ACTUATION AND DE-ACTUATION

CROSS-REFERENCE TO RELATED APPLICATIONS

This application claims priority to and the benefit of U.S. Provisional Patent Application No. 63/029,206, filed May 22, 2020, and entitled "LAVATORY DOORS USING TOUCH LESS ACTUATION AND DE-ACTUATION MECHANISM", the entire content of which is incorporated herein by reference in its entirety.

BACKGROUND

1. Field

The present disclosure relates generally to lavatory doors, and more particularly to lavatory doors for aircraft interiors.

2. Description of Related Art

Lavatory systems must include certain features to be compliant for certification, for example, the lavatory must offer a certain amount of privacy and be accessible to all users including those in wheelchairs. Conventional lavatory systems include a series of foldable doors, each having a door lock and latch assembly, which allows the occupant to lock the door. However, requiring the door lock and latch assembly to be operated by hand can create a high touch point surface, which can transmit pathogens from one user to another, creating a safety and health concern to users of the lavatory system.

The conventional techniques have been considered satisfactory for their intended purpose. However, there is an ever present need for improved systems and methods for touch free operation of lavatory door systems. This disclosure provides a solution for this need.

SUMMARY

A door system comprises a door, the door including a latch assembly configured to latch the door to a door frame to maintain the door in a closed position and to unlatch to allow the door to open to an opened position. A foot pedal is operatively connected to unlatch the latch assembly upon actuation by a user's foot. In certain embodiments, a handle can be operatively connected to unlatch the latch assembly upon actuation a user. The door system further includes the door frame and set of hinges operatively connecting the door to the door frame.

At least one helical spring can be disposed on the set of hinges, and a gas spring can operatively connect between the door and the door frame. The at least one helical spring and the gas spring can be configured to exert a resultant spring force on the door to open the door in the unlatched position. In certain embodiments, the door can include a pair of door panels hingedly connected to one another along a hinge line. The latch assembly can actuate in a direction into and out the door, parallel to the hinge line. The latch assembly can include a pair of latch members, each latch member positioned at opposed ends of the door.

In embodiments, each latch member is operatively connected to a rack, the rack including an upper rack and a lower rack. Each rack is configured to move parallel to the hinge line. Each rack is meshed with a pinion gear for synchronized actuation of each latch member. A linkage operatively connects the foot pedal to the pinion gear. In embodiments, the latch assembly can include a compression spring disposed around each latch member between the rack and a tip of latch member configured to bias each latch member in the latched position.

In embodiments, the foot pedal can be a first foot pedal, and the door system can include a second foot pedal. In certain embodiments, the first foot pedal can be an exterior foot pedal, and the second foot pedal can be an interior foot pedal. In certain embodiments, the first and second foot pedals are foldably connected to a linkage, such that the first and second foot pedals are configured to move between a folded position and an unfolded position. In the folded position, actuation of the latch assembly is prohibited and in the unfolded position, actuation of the latch assembly is permitted.

In certain embodiments, a foot actuated door lock can be disposed on an interior surface of the door, slidable between a locked position and an unlocked position. The locked position restricts movement of the foot pedal and the unlocked position permits movement of the foot pedal. At least one removable access panel can be included on the door positioned for at least one of: servicing the latch assembly and/or a rack and gear assembly; and/or for an emergency opening of the door.

An electromechanical door system includes a door, the door having a latch assembly configured to latch the door to a door frame to maintain the door in a closed position and to unlatch to allow the door to open to an opened position. A foot pedal is operatively connected to contact a sensor, and at least one motor is operatively connected the latch assembly.

In embodiments, a microcontroller is operatively connected to the sensor. The microcontroller can include machine readable instructions to actuate the at least one motor to unlatch the latch assembly upon actuation of the foot pedal and contact with the sensor. In certain embodiments, the sensor can be a first sensor and at least one additional sensor can be disposed on a doorframe configured to sense an obstruction in the doorframe.

The machine readable instructions can be configured to cause the microcontroller to perform a method. The method can include actuating the at least one motor of the latch assembly to unlatch the door to move the door to an open position, and holding the door in the open position for a threshold period of time. After the threshold period of time, the method includes if an obstruction is present in the door frame.

If no obstruction is present in the door frame, the method releasing the door from the open position and actuating the at least one motor of the latch assembly to retain the door in the latched position. If an obstruction is present in the door frame, the method includes maintaining the door in the open position until the obstruction is no longer present, then releasing the door from the open position and actuating the at least one motor of the latch assembly to retain the door in the latched position. In certain embodiments, the method can further include, actuating the at least one motor of the latch assembly upon receipt of a user input.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make

DETAILED DESCRIPTION

Figure 1:
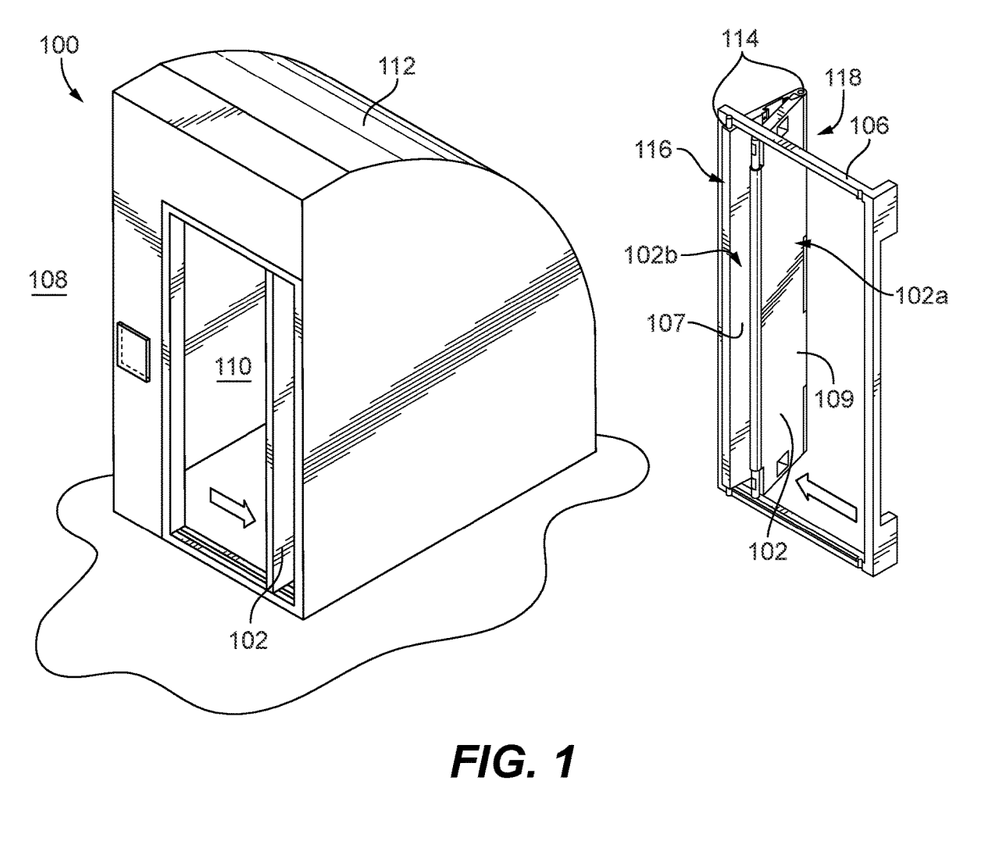
FIG. 1 is a schematic perspective view of an embodiment of a door system constructed in accordance with the present disclosure, showing an open position and a closed position of the door system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-8, as will be described. The systems and methods described herein can be used to reduce transmission of pathogens at lavatory doors.

Conventional lavatory door systems consists of at least one door panel, a set of hinges, a lock and/or latch assembly, at least one preloaded spring (if required), and status bar to indicate whether the lavatory is occupied. During normal operation, in order to access the lavatory, the door needs to be pushed at a portion marked "PUSH," or by using a lever assembly that is rotated to open the single door. Once inside the lavatory, the door system can be locked from inside by sliding a knob longitudinally, which can mechanically actuate a locking bar and maintaining the door in the locked position. If a preloaded spring is included, the spring biases the door in the open position, so that when the latch assembly is moved to the unlocked position, little force is required to open the door.

However, requiring the door lock and latch assembly to be operated by hand can create a high touch point surface, which can transmit pathogens from one user to another, creating a safety and health concern to users of the lavatory system. Provided herein is a door system 100 which includes a foot operated door locking and unlocking mechanism which can be readily retrofitted into the existing door unit with minor modifications. In certain embodiments, the door system 100 can include a completely mechanical system. It is also contemplated, in certain embodiments such as door system 200, the system 200 can be an electro-mechanical mechanism. Both system 100 and 200 can retrofitted into current door units with minor modifications, reducing the number of parts used.

Referring now to FIG. 1, the door system 100 comprises a door 102, the door including a latch assembly 104. The latch assembly 104 is configured to latch the door 102 to a door frame 106, maintaining the door 102 in the closed position. The latch assembly 104 is also configured to unlatch the door 102 from the door frame 106 to allow the door to open to the opened position. The door 102 defines a barrier an exterior space 108 and an interior space 110, for example, an interior of a lavatory 112. A set of hinges 114 operatively connects the door 102 to the door frame 106 along a first hinge line 116. In certain embodiments, the door 102 can include a pair of door panels 102a, 102b hingedly connected to one another along a second hinge line 118, parallel to the first hinge line 116.

Figure 2:
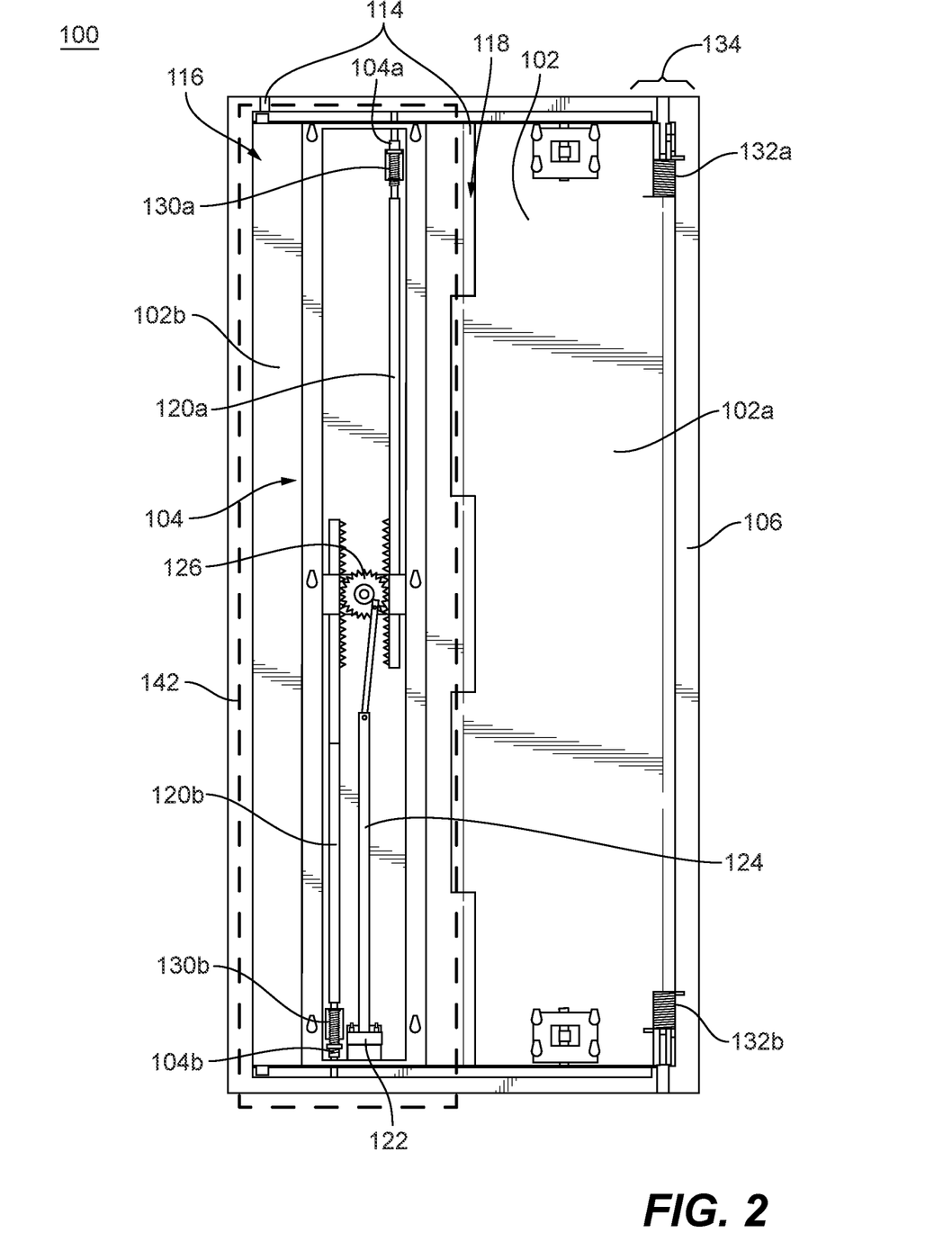
FIG. 2 is a schematic view of the door system of FIG. 1, showing a latch assembly.

Turning to FIG. 2, the latch assembly 104 can include a pair of latch members 104a, 104b, one at each opposed end of the door 102. Each latch member is operatively connected to a rack 120, the rack including an upper rack 120a and a lower rack 120b. A foot pedal 122 is operatively connected to the latch assembly 104 by a linkage 124 to unlatch the latch assembly 104 upon actuation of the foot pedal 122 by a user's foot. Each rack 120a, 120b is meshed with a pinion gear 126 connected to the linkage 124 to move each rack 120a, 120b synchronously and parallel to at least the first hinge line 116 when actuated by the foot pedal 122. In certain embodiments, a handle 128 can be operatively connected to the linkage 124 to unlatch the latch assembly 104, for example if a user 101 does not have the ability to actuate the foot pedal 122. In embodiments, the foot pedal 122 can be a first foot pedal 122a on an outer surface 107 of the door 102, for actuation from the exterior space 108 (e.g. entering the lavatory 112). A second foot pedal 122b can be included on an inner surface 109 of the door 102, for actuation from the interior space 110 (e.g. exiting the lavatory 112). Both the first and second foot pedals 122a, 122b operate in the same or similar manner.

The latch assembly 104 includes a compression spring 130a, 130b, disposed around each latch member 104a, 104b between each rack 120a, 120b the door frame 106 configured to bias each latch member 104a, 104b in the latched position. In operation, when the foot pedal 122 is actuated, and the racks 120a, 120b move, each latch member 104a, 104b is pulled against the force of the compression spring 130a, 130b to unlatch the door 102, for example into the door 102. The set of hinges includes at least one helical spring 132a, 132b, and a gas spring 134 can operatively connect between the door 102 and the door frame 106. The at least one helical spring 132a, 132b and the gas spring 134 can be configured to exert a resultant spring force F on the door 102, such that when the foot pedal 122 is actuated, and the latch members 104a, 104b are retracted into the door 102, the door 102 will open with relatively little effort with the aid of the springs 132a, 132b, 134. When the foot pedal 122 is released, the latch members 104a, 104b will extend out of the door 102 and into the latched position to maintain the door 102 in the closed position.

Figure 3:
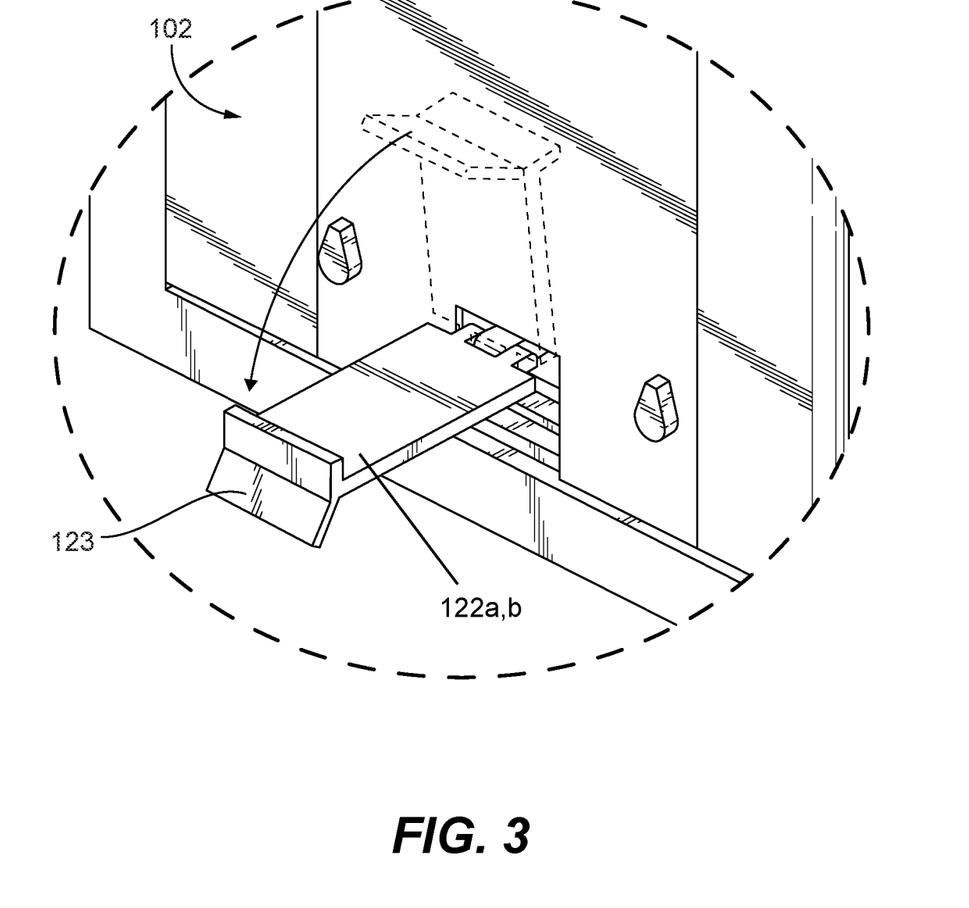
FIG. 3 is an enlarged partial schematic view of the door system of FIG. 1 showing a foot pedal.

As shown in FIG. 3, in certain embodiments, the first and second foot pedals 122a, 122b can be foldably connected to the linkage 124 to move between a folded position and an unfolded position. In the folded position, actuation of the latch assembly 104 is prohibited and the foot pedal 122 retains a low profile parallel, or nearly parallel to the door 102. In this manner, when the pedal is not in use, it can be folded so as not to create an obstruction. In the unfolded position, actuation of the foot pedal 122 and latch assembly 104 is permitted. In certain embodiment, the foot pedal 122 can include at least one protrusion 123, to assist in folding and unfolding the pedal 122.

Figure 4:
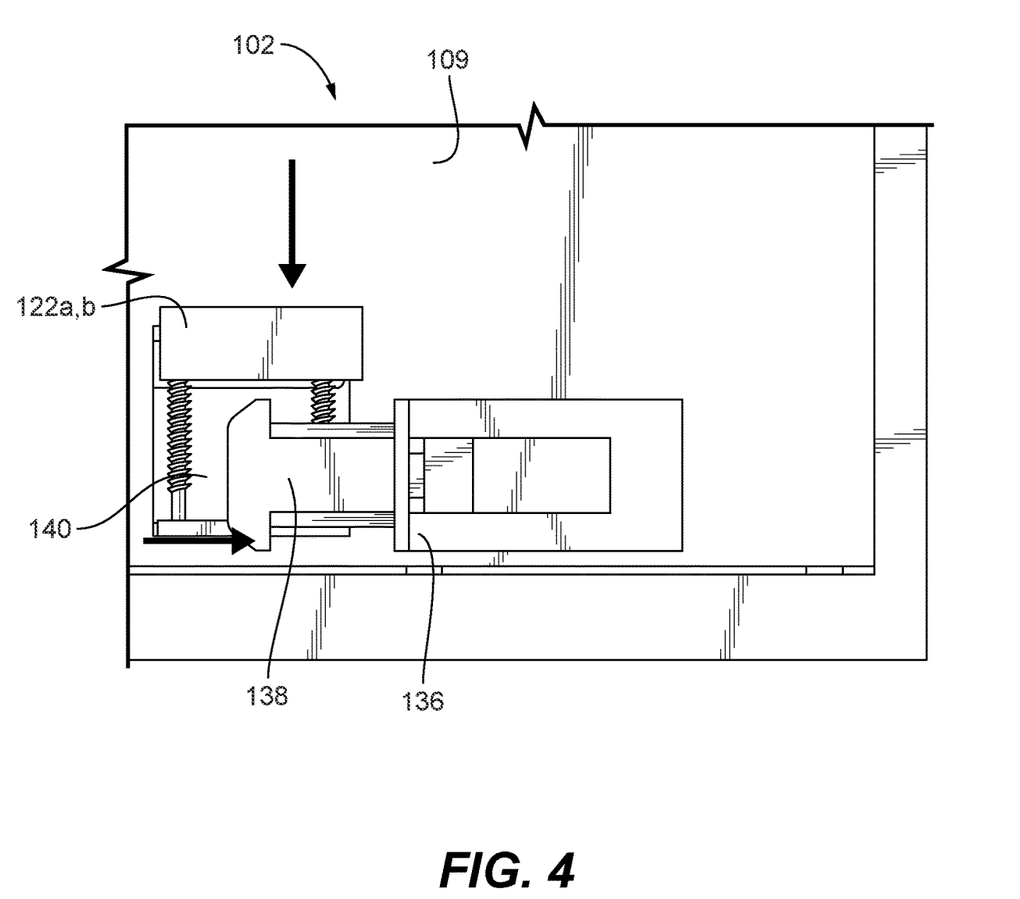
FIG. 4 is an enlarged partial schematic view of the door system of FIG. 1 showing a foot actuated door lock.

Referring now to FIG. 4, a foot actuated door lock 136 can be disposed on the inner surface 109 of the door 102, slidable between a locked position and an unlocked position. For example, when a user enters the lavatory 112, after closing the door 102, the second foot pedal 122b can be moved to the folded position, and the foot actuated door lock 136 can be actuated to move a stopper 138 into the aperture 140 in which the foot pedal 122a travels. In this way, movement of the first and second foot pedals 122a, 122b is completely, or near completely restricted, offering security and privacy to the user in the lavatory 112. To exit the lavatory, the foot actuated door lock 134 can be slid in the opposite direction to remove the stopper 138 from the aperture 140, so that movement of the foot pedals 122a, 122b is restored.

At least one removable access panel 142 can be included on the door 102 (e.g. as shown in FIG. 2). The access panel 142 can be positioned for easy removal for servicing the latch assembly 104 and/or the racks 120 and gear 126. On certain occasions, it may be necessary to evacuate the user 101, such as a jammed door lock, broken door lock, or seized door. The access panel 142 therefore should positioned and configured to easily removed, for example to avoid having to break the door, use machinery, or emergency landing of an aircraft.

Figure 5:
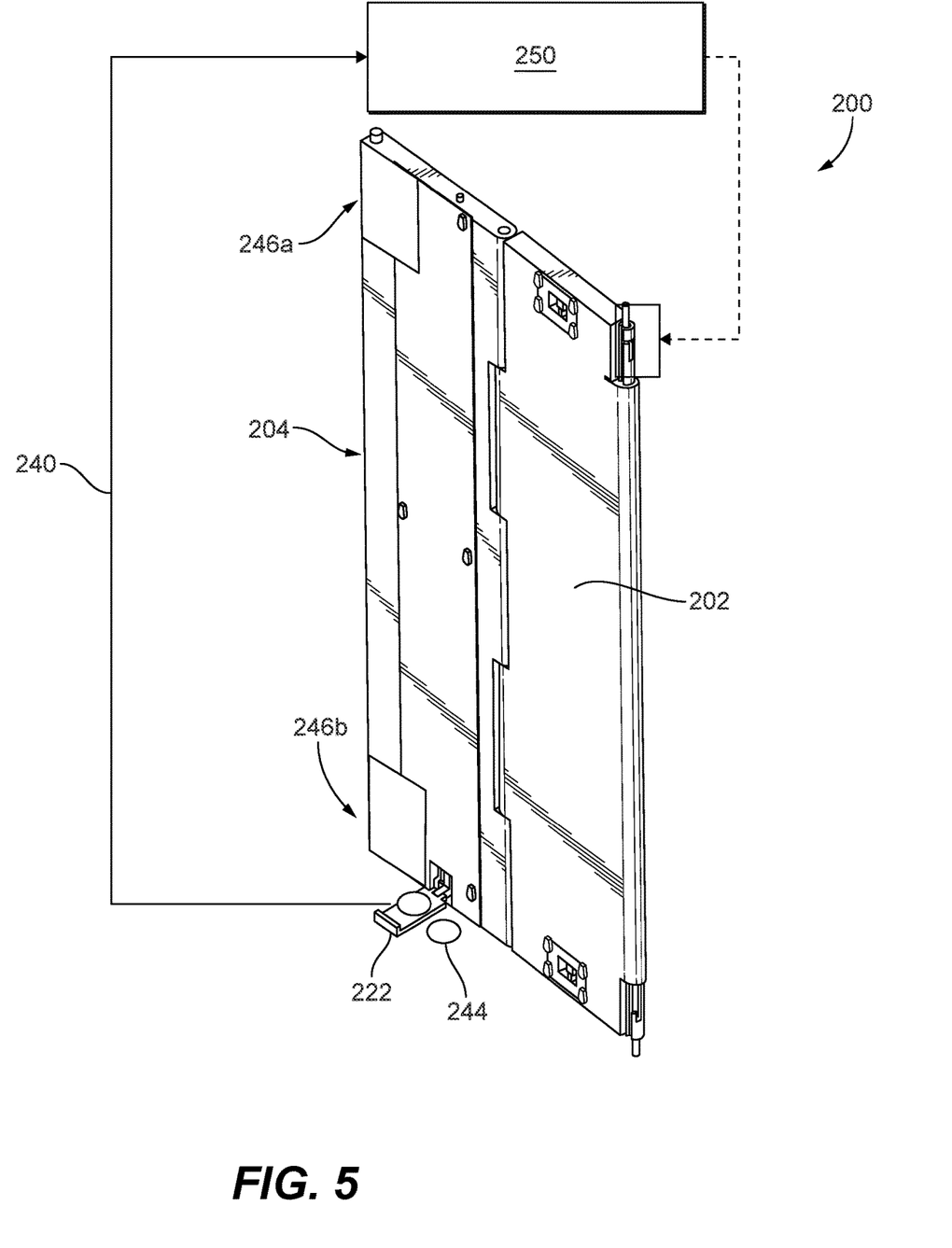
FIG. 5 is a schematic perspective view of another embodiment of a door system constructed in accordance with the present disclosure.

Turning now to FIG. 5, an electromechanical door system 200 includes a door 202, the door 202 having a latch assembly 204, and a foot pedal 222. The latch assembly 204 and foot pedal 222 can be the same or similar to those as described with respect to system 100. But in system 200, the foot pedal 222 is operatively connected to contact a sensor 244, and at least one motor 246a, 246b is operatively connected the latch assembly 204.

For example, the sensor 244 can be below the foot pedal 222, such that when the foot pedal 222 is actuated, the sensor 246 is tripped, sending a sensor signal 248. The senor signal 248 can then be routed to a microcontroller 250 operatively connected to the sensor 244. The microcontroller 250 can include machine readable instructions to actuate the at least one motor 246a, 246b to unlatch the latch assembly 204 upon actuation of the foot pedal 222 and contact with the sensor 244, the motors 246a, 246b being actuated simultaneously. The motors 246a, 246b can be meshed with a pinion gear 226, configured to move a pair of racks 220 within the door frame 206. The motors 246a, 246b can then hold the door 202 in the open position for a threshold amount of time, for example, until a close command is issued from the microcontroller 250. The threshold amount of time can be a predetermined amount of time where the close command is automatically issued at the expiration of the threshold amount of time, or the threshold amount of time can include the amount of time for a passenger to clear the frame, as described below, or any suitable combination thereof can be used.

Figure 6:
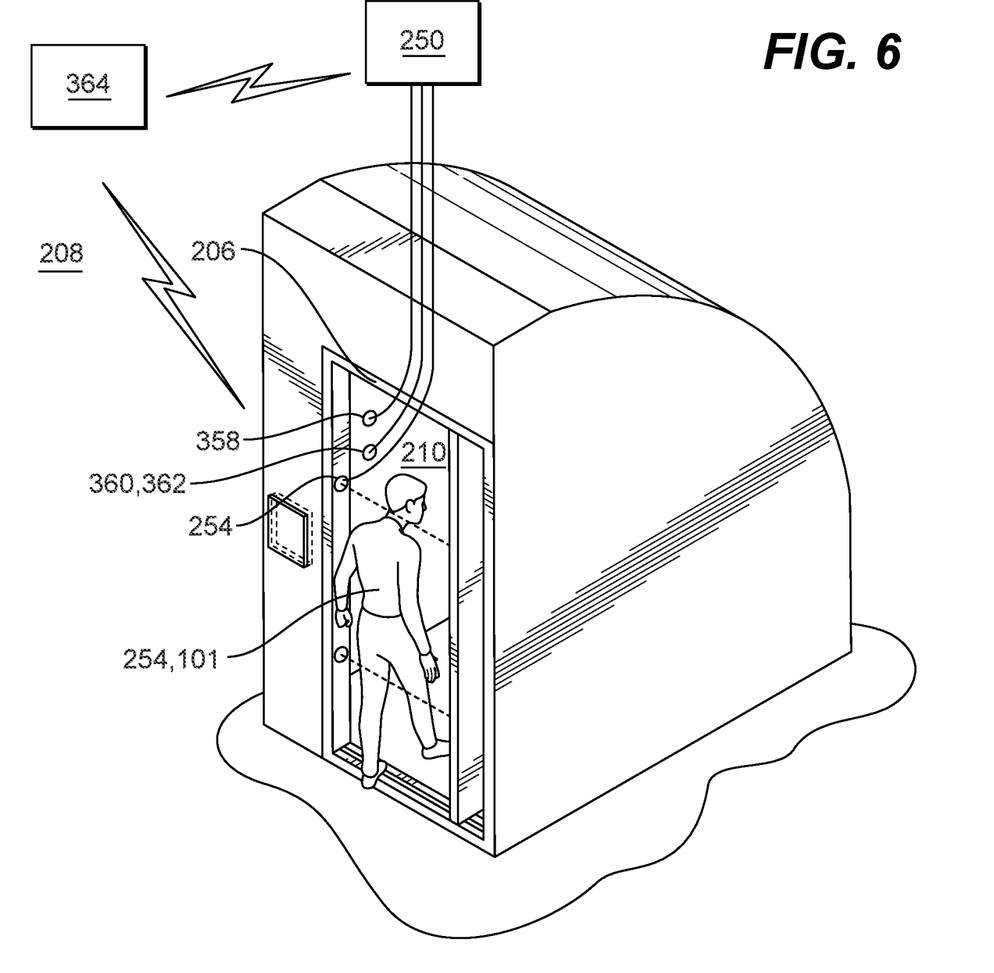
FIG. 6 is a schematic perspective view of a user interacting with the door system of FIG. 5.

In embodiments, such as in FIG. 6, at least one additional sensor 252 can be disposed on the doorframe 206 configured to sense an obstruction 254 in the doorframe 206. For example, the additional sensor 252 can scan the position of the user 101 while crossing the door frame 206, in order to avoid prematurely closing the door 202 while the user 101 is still crossing the frame 206. If no obstruction 254 is present in the door frame 206, the microcontroller 250 can issue the close command and release the door 202 from the open position and actuating the at least one motor 246a, 246b of the latch assembly 204 to retain the door in the latched position. If an obstruction 254 is present in the door frame 206, the microcontroller 250 can maintain the door 202 in the open position until the obstruction 254 is no longer present, then after the obstruction 254 has cleared, release the door 202 from the open position and actuating the at least one motor 246a, 246b of the latch assembly 204 to retain the door 202 in the latched position.

In certain embodiments, for example in both system 100 and 200, interior sensors 358 may be included in the interior 110, 210 of the lavatory 112, 212 to monitor for health and safety concerns, or provide a manner for actuating the door 102, 202 if the user 101 is unable to do so with either their hands or feet. For example, a microphone 360 and speaker 362 can be included to provide a means of communication between the user 101 and emergency services or crew on the exterior 108, 208 of the lavatory 112, 212. In embodiments, the microphone 360 can be operatively connected to the microcontroller 250 to actuate the motors 246a, 246b to unlatch the doors 202 upon the user issuing a voice command, or other user input.

Figure 7:
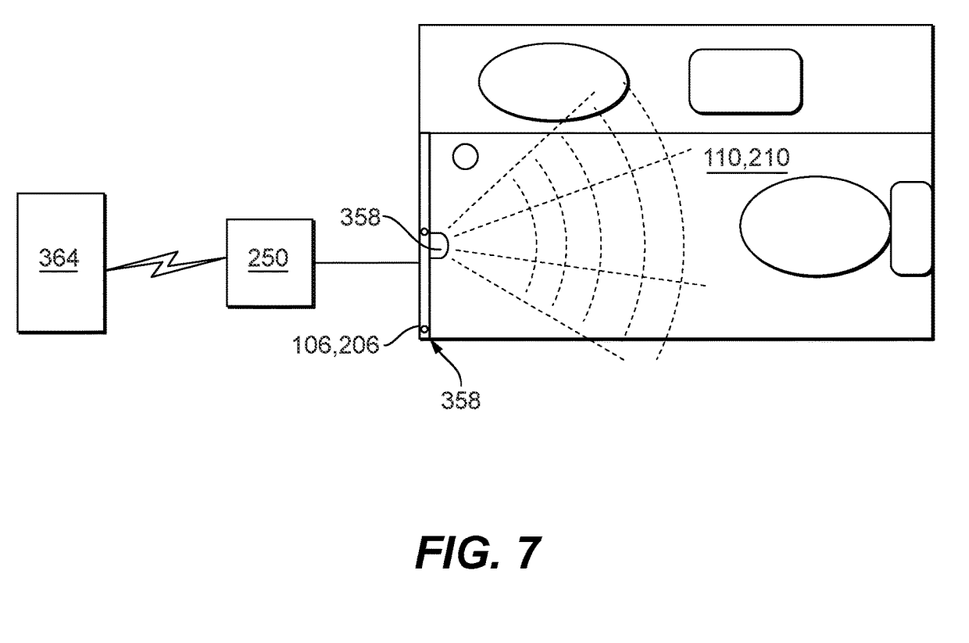
FIG. 7 is a schematic diagram of a sensor system included in the door systems of FIGS. 1 and 5.

Referring now to FIG. 7, the interior sensors 358 can include sensors to detect presence and consciousness (e.g. passive infrared sensors and/or any proximity sensors). For example, the interior sensor 358 can be configured to scan the interior 110, 210 of the lavatory 112, 212 at chosen time intervals (e.g. every 10 seconds) to confirm the occupancy and the consciousness of the user 101. The interior sensors 358 can be operatively connected to a notification device 364 to communicate emergencies with crew, for example if the interior sensor 358 determines a user 101 is unconscious. In certain embodiments, if the interior sensor 358 scans for the movement of the user 101 continuously and if no movement is found, the microphone 360 and speaker 362 may be activated to alert the user 101. If the user 101 does not react to the command within a predetermined amount of time, (e.g. within 30 seconds), the microcontroller 250 can send a message to the notification device 364, instructing the crew to take action within a certain amount of time.

Figure 8:
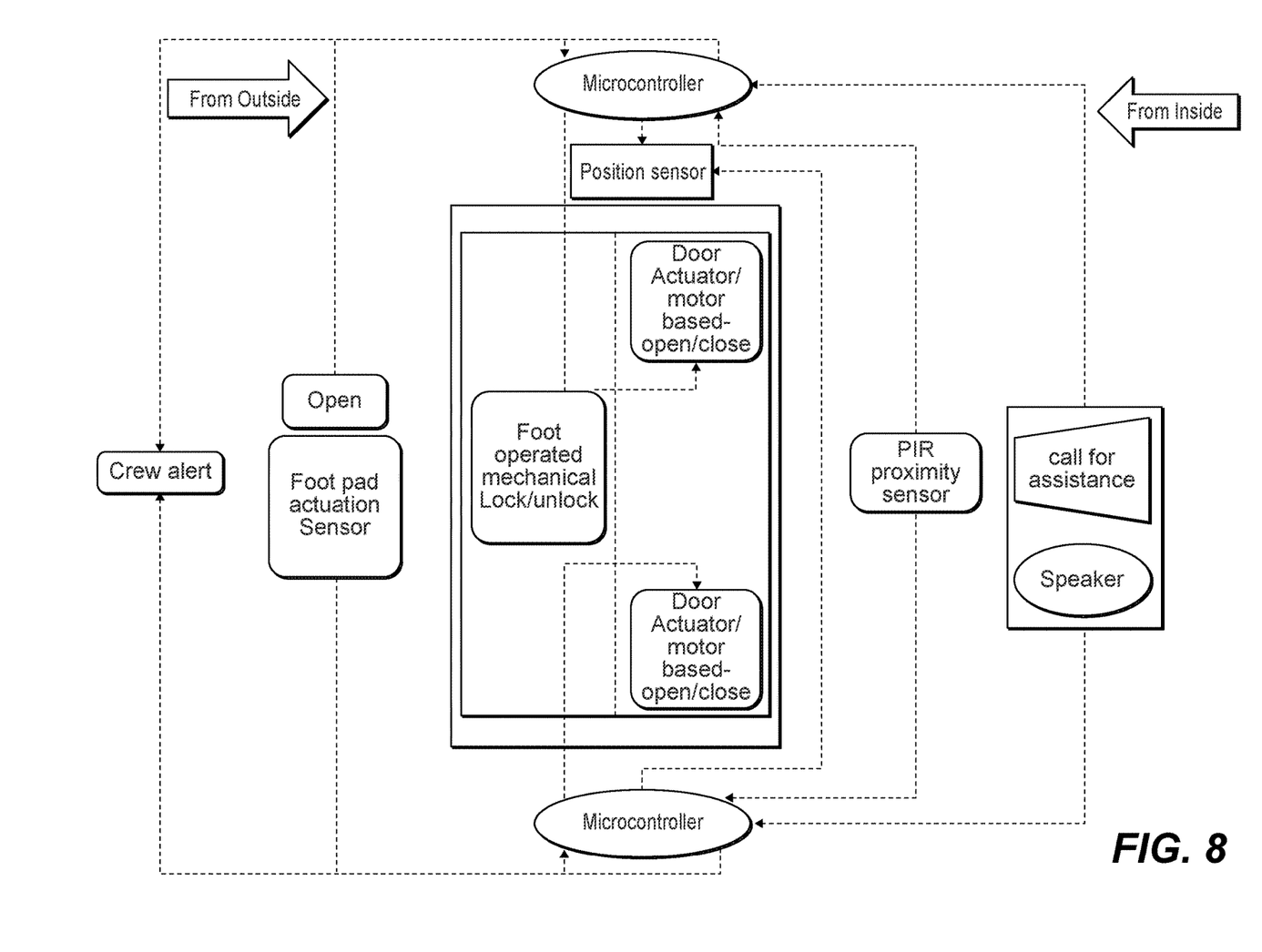
FIG. 8 is a schematic flow diagram of a method of operating the door system of FIGS. 1 and 5.

Therefore, such systems 100, 200, including the interior sensor 358 and the access panel 140, can provide a failsafe design that allows the door 102, 202 to be opened manually in the event of emergency or in case of door failure. A method for operating the door 102, 202, for example in an emergency, is depicted in FIG. 8. The methods and systems of the present disclosure, as described above and shown in the drawings, provide for improved touch free door systems.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A door system comprising:
   a door including a latch assembly configured to latch the door to a door frame to maintain the door in a closed position and to unlatch to allow the door to open to an opened position;
   a foot pedal operatively connected to unlatch the latch assembly upon actuation by a user's foot, wherein the latch assembly includes a pair of latch members at opposed ends of the door, wherein each latch member is operatively connected to a rack, the rack including an upper rack and a lower rack, wherein each rack is configured to move parallel to a hinge line, and wherein each rack is meshed with a pinion gear for synchronized actuation of each latch member; and
   at least one removable access panel on the door positioned for at least one of: servicing the latch assembly or a rack and gear assembly, or for an emergency opening of the door.

2. The door system as recited in claim 1, further comprising:
   the door frame; and
   set of hinges operatively connecting the door to the door frame.

3. The door system as recited in claim 2, further comprising at least one helical spring disposed on the set of hinges, and a gas spring operatively connected between the door and the door frame, wherein the at least one helical spring and the gas spring are configured to exert a resultant spring force on the door to open the door in the unlatched position.

4. The door as recited in claim 1, wherein the door includes a pair of door panels hingedly connected to one another along the hinge line.

5. The door system as recited in claim 4, wherein the latch assembly actuates in a direction into and out of the door, parallel to the hinge line.

6. The door system as recited in claim 1, further comprising a linkage operatively connecting the foot pedal to the pinion gear.

7. The door system as recited in claim 1, wherein the latch assembly further comprises a compression spring disposed around each latch member between the rack and a tip of each latch member configured to bias each latch member in a latched position.

8. The door system as recited in claim 1, wherein the foot pedal is a first foot pedal, and further including a second foot pedal, wherein the first foot pedal is an exterior foot pedal, wherein the second foot pedal is an interior foot pedal.

9. The door system as recited in claim 8, wherein the first and second foot pedals are foldably connected to a linkage, wherein the first and second foot pedals are configured to move between a folded position and an unfolded position.

10. The door system as recited in claim 9, wherein in the folded position, actuation of the latch assembly is prohibited and wherein in the unfolded position, actuation of the latch assembly is permitted.

11. The door system as recited in claim 8, wherein the first and second foot pedals are foldably connected to a linkage, wherein the first and second foot pedals are configured to move between a folded position and an unfolded position, wherein in the folded position actuation of the latch assembly is prohibited, and wherein in the unfolded position actuation of the latch assembly is permitted.

12. The door system as recited in claim 1, further comprising a foot actuated door lock disposed on an interior surface of the door slidable between a locked position and an unlocked position, wherein the locked position restricts movement of the foot pedal and wherein the unlocked position permits movement of the foot pedal.

13. The door system as recited in claim 1, further comprising a handle operatively connected to unlatch the latch assembly upon actuation by a user.

14. The door system as recited in claim 1, further comprising a foot actuated door lock disposed on an interior surface of the door slidable between a locked position and an unlocked position, wherein the locked position restricts movement of the foot pedal and wherein the unlocked position permits movement of the foot pedal.

15. The door system as recited in claim 1, further comprising a handle operatively connected to unlatch the latch assembly upon actuation by a user and at least one removable access panel on the door positioned for at least one of: servicing the latch assembly or a rack and gear assembly, or for an emergency opening of the door.

16. A door system comprising:
   a door frame;
   a door including a latch assembly configured to latch the door to the door frame to maintain the door in a closed position and to unlatch to allow the door to open to an opened position;
   a set of hinges operatively connecting the door to the door frame;
   at least one helical spring disposed on the set of hinges;
   a gas spring operatively connected between the door and the door frame; and
   a foot pedal operatively connected to unlatch the latch assembly upon actuation by a user's foot, wherein the latch assembly includes a pair of latch members at opposed ends of the door, wherein each latch member is operatively connected to a rack, the rack including an upper rack and a lower rack, wherein each rack is configured to move parallel to a hinge line, wherein each rack is meshed with a pinion gear for synchronized actuation of each latch member, and wherein the at least one helical spring and the gas spring are configured to exert a resultant spring force on the door to open the door in the unlatched position.

17. The door as recited in claim 16, wherein the door includes a pair of door panels hingedly connected to one another along the hinge line, wherein the latch assembly actuates in a direction into and out of the door, parallel to the hinge line.

18. The door system as recited in claim 16, further comprising a linkage operatively connecting the foot pedal to the pinion gear.

19. The door system as recited in claim 16, wherein the latch assembly further comprises a compression spring disposed around each latch member between the rack and a tip of each latch member configured to bias each latch member in a latched position.

20. The door system as recited in claim 16, wherein the foot pedal is a first foot pedal, and further including a second foot pedal, wherein the first foot pedal is an exterior foot pedal, wherein the second foot pedal is an interior foot pedal.

* * * * *